US006476590B2

(12) United States Patent
Chou

(10) Patent No.: US 6,476,590 B2
(45) Date of Patent: Nov. 5, 2002

(54) RESIDUAL IMAGE IMPROVING SYSTEM FOR A LIQUID CRYSTAL DISPLAY (LCD)

(75) Inventor: Hsien-Ying Chou, Hsinchu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 09/767,954

(22) Filed: Jan. 24, 2001

(65) Prior Publication Data

US 2002/0041279 A1 Apr. 11, 2002

(30) Foreign Application Priority Data

Oct. 11, 2000 (TW) .................................... 89121220 A

(51) Int. Cl.[7] ........................... G05F 1/40; G06F 17/30
(52) U.S. Cl. ......................................... 323/284; 345/99
(58) Field of Search ................................ 323/284, 282, 323/283, 285, 286; 363/16, 17, 20; 365/226, 229; 345/99, 204, 558

(56) References Cited

U.S. PATENT DOCUMENTS

| | | | | | |
|---|---|---|---|---|---|
| 4,451,742 | A | * | 5/1984 | Aswell | 307/66 |
| 4,777,626 | A | * | 10/1988 | Matsushita et al. | 365/226 |
| 5,040,220 | A | * | 8/1991 | Iwamatsu | 381/63 |
| 5,280,280 | A | * | 1/1994 | Hotto | 345/94 |
| 5,568,329 | A | * | 10/1996 | Hirohata et al. | 360/32 |
| 5,628,025 | A | * | 5/1997 | Chung et al. | 395/800 |
| 6,108,215 | A | * | 8/2000 | Kates et al. | 363/17 |

* cited by examiner

*Primary Examiner*—Rajnikant B. Patel
(74) *Attorney, Agent, or Firm*—Darby & Darby

(57) ABSTRACT

This invention relates to a residual image improving system for a LCD, thereby effectively improving the residual image effect. The improving system includes: a power supply for providing an operating power; a voltage detector for detecting the voltage level of an external power by comparison to a predetermined voltage level under the operating power and producing a control signal by comparing the result; and a video and timing control unit for outputting a predetermined pattern to the LCD according to the control signal so as to improve the residual image effect.

15 Claims, 4 Drawing Sheets

RESIDUAL IMAGE IMPROVING SYSTEM FOR A LIQUID CRYSTAL DISPLAY (LCD)

BACKGROUND OF THE INVENTION

1. Field of the Invention

This invention relates to an improving system for a display, and particularly to a residual image improving system for a LCD.

2. Description of the Related Art

FIG. 1*a* shows an equivalent circuit of a LCD after it is powered off. As shown in FIG. 1*a*, after it is powered off, the terminal voltage of a LCD is recharged and reduced to 0 V. At this point, when the LCD's switch S has a high impedance at which the terminal voltage of the LCD is 0 V, the charge (i.e. $C_{LC}$) of the LCD cannot be recharged right away, thereby producing a residual image on the LCD. FIG. 1*b* shows another equivalent circuit of the LCD after it is powered off. In FIG. 1*b*, the circuit includes an equivalent resistance $R_{off}$ and an equivalent capacitance $C_{LCD}$. As shown in FIG. 1*b*, the terminals A and B of the circuit have no input power so that the voltages on both A and B are zero. However, because the power is supplied to the capacitance $C_{LCD}$ through the resistance $R_{off}$ before the power is turned off, the capacitance $C_{LCD}$ has residual charge after the power is turned off. This is because the resistance $R_{off}$ is too high to release the charge completely. Thus, a residual image effect shows up and it lasts for a period of time that cannot be accepted by consumers. Hence, improving the residual image effect is necessary. Typically, the improvement is made by the manufacturing processor. The resistance $R_{off}$ is reduced during manufacturing so that the charge in the capacitance $C_{LCD}$ can be released. However, a problem in such a manner is that the current $I_{off}$ becomes higher when the resistance $R_{off}$ is reduced according to the Ohmic Rule and incurs a current leakage during normal operation.

SUMMARY OF THE INVENTION

Therefore, an object of the invention is to provide a residual image improving system for a LCD, thereby effectively improving the residual image effect.

A further object of the invention is to provide a residual image improving system for a LCD, thereby resolving the current leakage in the typical manner.

To realize the above and other objects, the invention provides a residual image improving system for a LCD. The improving system includes: a power supply for providing an operating power; a voltage detector for detecting the voltage level of an external power by comparison to a predetermined voltage level under the operating power and producing a control signal by comparing the results; and a video and timing control unit for outputting a predetermined pattern to the LCD according to the control signal so as to improve the residual image effect.

Accordingly, the invention cannot only prevent the visual system of a human being from the influence of the residual image effect, but also resolve the current leakage by avoiding the resistance change that causes the current leakage in the typical manner, thereby improving the residual image effect.

BRIEF DESCRIPTION OF THE DRAWINGS

The invention will become apparent by referring to the following detailed description of a preferred embodiment with reference to the accompanying drawings, wherein.

DETAILED DESCRIPTION OF THE INVENTION

Figure 2:
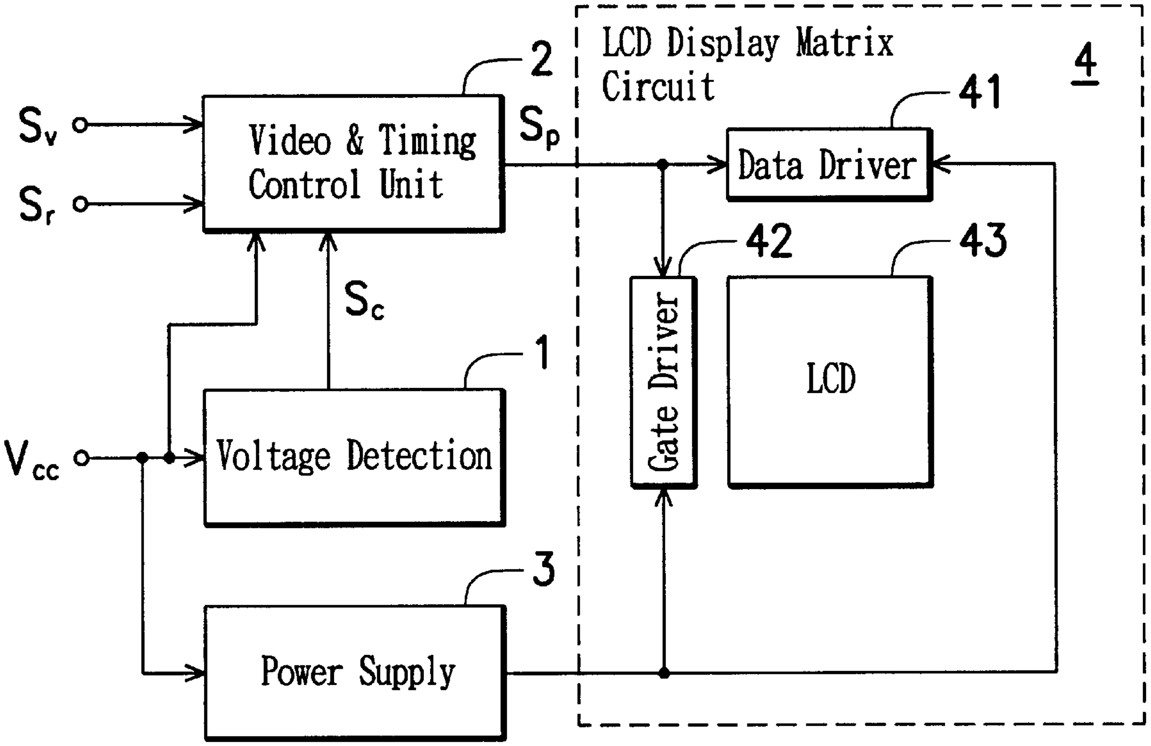
FIG. 2 is a schematic diagram of a system configuration of the invention.
Figure 3:
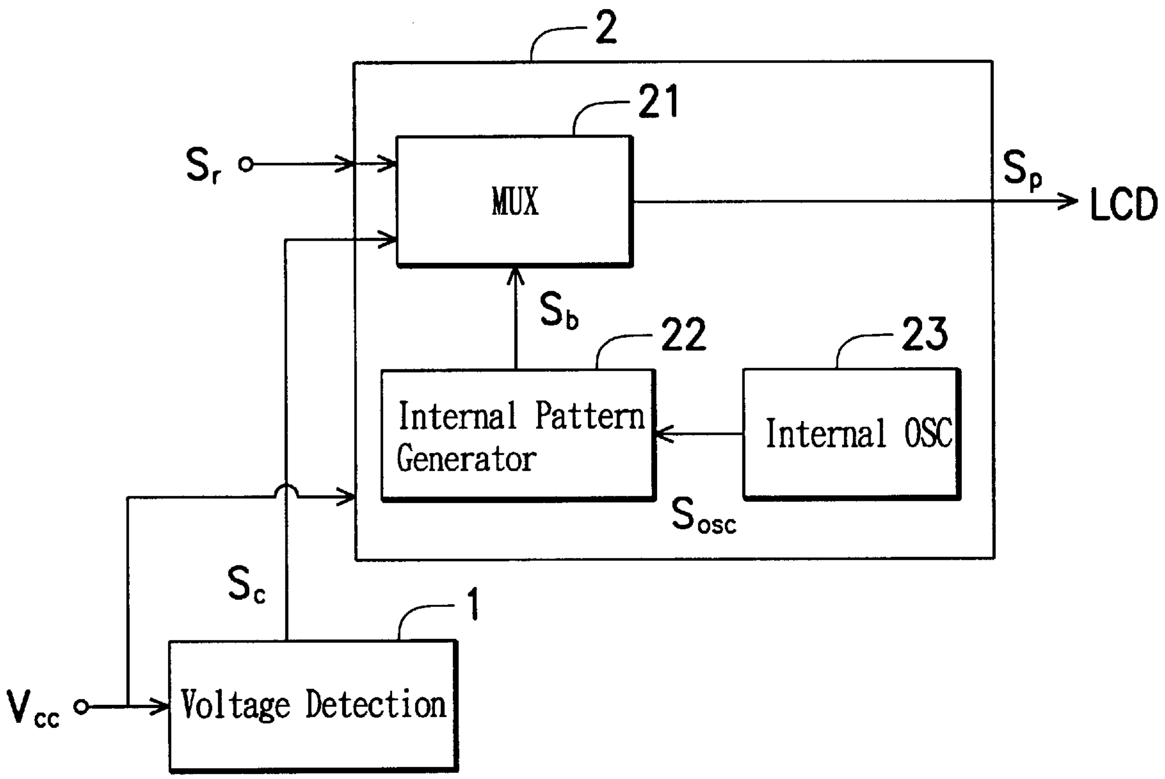
FIG. 3 is a schematic diagram of a video and timing control unit of the invention.
Figure 4:
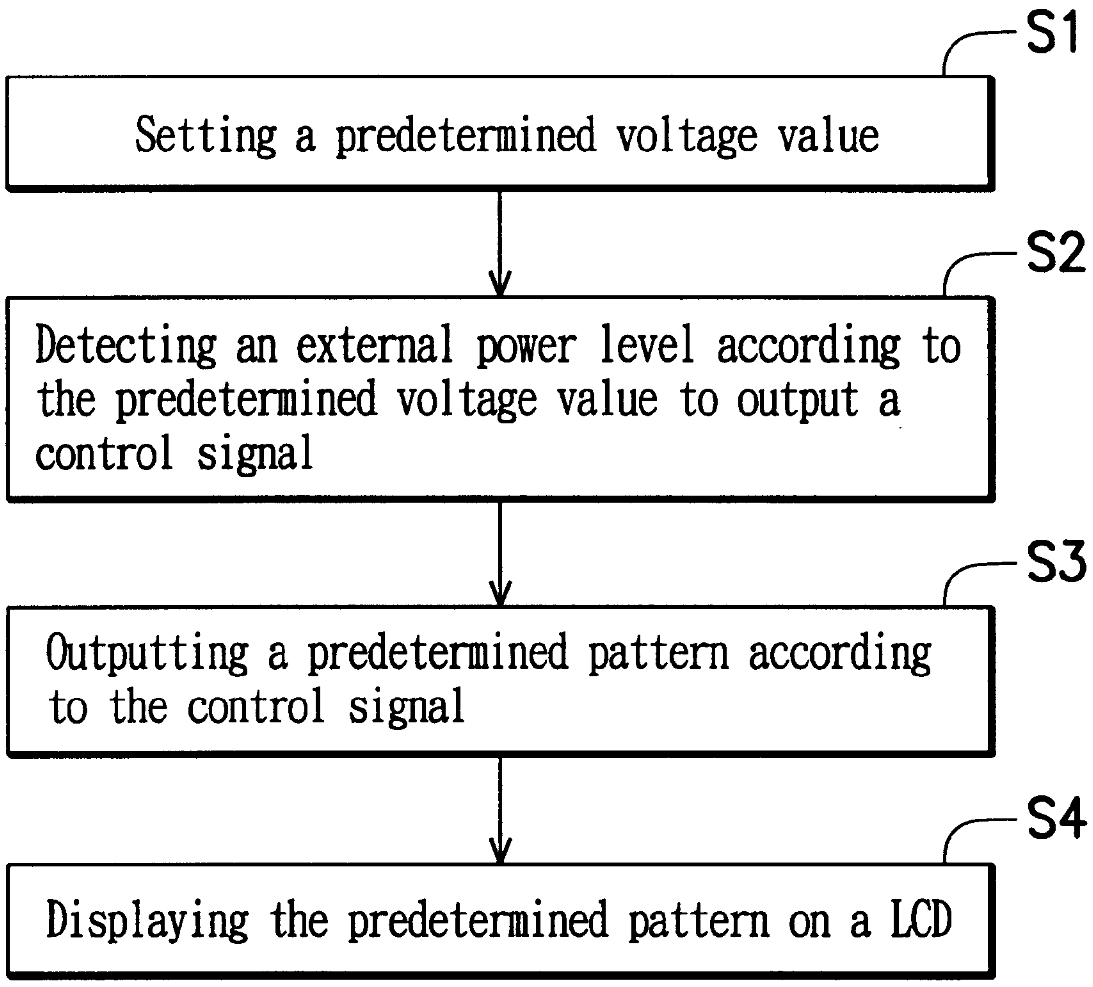
FIG. 4 is a flowchart of the invention.

Refer to FIG. 2, a schematic diagram of the system configuration. In FIG. 2, in addition to the conventional components of a video and timing control unit 2, a power supply 3, and a LCD display matrix circuit 4, a voltage detector 1 is added. The video and timing control unit 2 is an improved device as described as follows. As shown in FIG. 2, the threshold voltage of the voltage detector 1 is set to a level slightly higher than the power-off voltage level of the power supply 3 (FIG. 4, S1). Thus, the system can be powered by the power supply 3 in order to work for a while, even if the external power (not shown) is turned off. The power supply 3 is a DC power or a power produced from an AC power through the rectifier (not shown). As the system is closed, the power voltage Vcc, for example, 3.3 V, of the system input to the voltage detector 1 is down to a value between a predetermined threshold voltage, for example, 2.8 V or lower, and the operating voltage of the power supply 3, for example, 2.5 V. At this point, the voltage detector 1 outputs a switching control signal Sc to the video and timing control unit 2 according to the threshold voltage value (FIG. 4, S2). The detail of the video and timing control unit 2 is shown in FIG. 3. In FIG. 3, as compared to a typical video and timing control unit (not shown), the unit 2 adds a multiplexer 21, an internal pattern generator 22, and an internal oscillator 23.

Figure 1A:
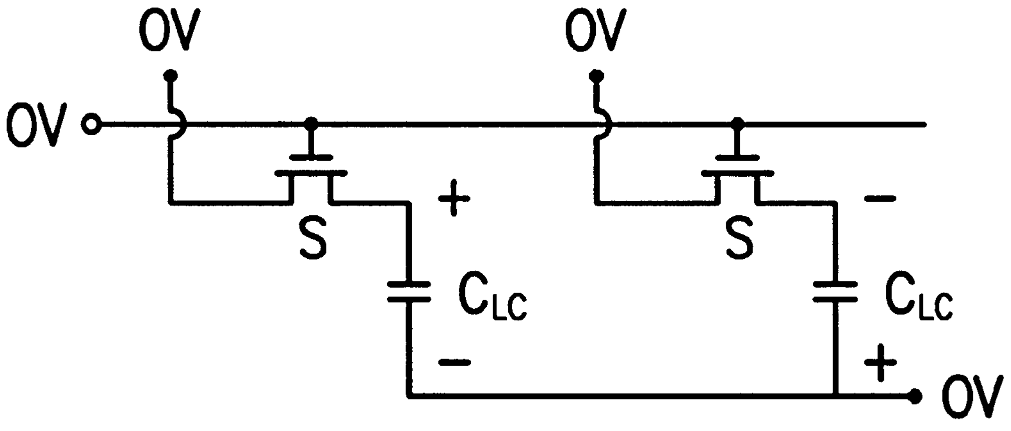
FIG. 1a (PRIOR ART)
FIG. 1*a* is a schematic diagram of an equivalence circuit of a LCD after it is powered off.
Figure 1B:
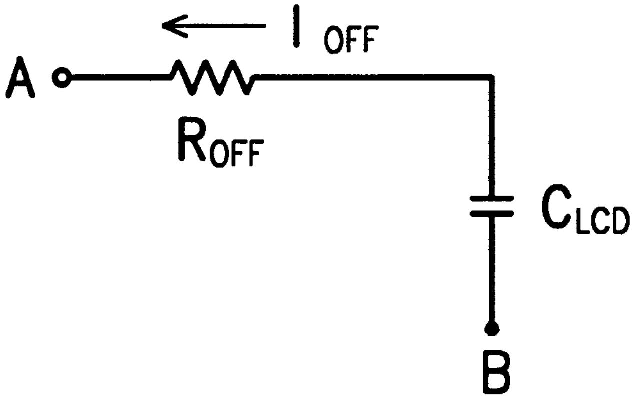
FIG. 1b (PRIOR ART)
FIG. 1*b* is a schematic diagram of another equivalence circuit of the LCD after it is powered off.

As shown in FIG. 3, the multiplexer 21 switches the input source from external to internal of the unit 2 (FIG. 4, S3). For example, the multiplexer 21 switches the input source from a video signal Sv and the corresponding signal Sr of the signal Sv to the signal Sb of the internal pattern generator 22. The internal pattern generator 22 produces a black, white, or any unaware pattern with a person's eyes on the LCD after it is powered off. In this manner, although the charge may not be released from the capacitance right away when the power supply 3 is closed and the terminals of the LCD circuit are discharged to 0 V (as shown in FIG. 1), the produced black, white, or any unaware pattern makes the residual image on the LCD imperceptible by the human eye. Therefore, not only the irritation to the eyes from the residual image of the LCD but also the current leakage caused by the changed resistance in the prior art is avoided. However, when the external signals Sv and Sr are cut off, the following action of switching the pattern into the black, white, or any unaware pattern cannot be performed because an external clock (not shown) and a synchronous signal (not shown) are cut off at the same time. Accordingly, an internal oscillator 23 is added to produce a local clock Sosc. The local clock Sosc is inputted into the internal pattern generator 22 to replace the external clock (not shown) (FIG. 4, S4). A control signal Sp is therefore produced and transmitted to the LCD display matrix circuit 4 in order to control a data driver 41 and a gate driver 42 within the circuit 4. The data driver 41 and the gate driver 42 respectively input a desired pattern and select the corresponding row and column to display the input pattern. This makes the power-off residual image on the LCD disappear.

To summarize the above, as shown in FIG. 4, the invention provides a LCD residual image improving method. The method includes the following steps: setting a predetermined voltage value according to an operating voltage (S1); detecting an external power level according to the predetermined voltage value to output a control signal to a video and timing control unit (S2); outputting a predetermined pattern from the video and timing control unit according to the control signal (S3); and displaying the predetermined pattern on a LCD (S4).

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. A LCD power-off residual image improving system, comprising:

a power supply for providing an operating power;

a voltage detector for detecting the voltage level of an external power by comparison to a predetermined voltage level under the operating power and producing a control signal by comparing the result; and a video and timing control unit for outputting a predetermined pattern to the LCD according to the control signal so as to improve the residual image effect.

2. The LCD power-off residual image improving system of claim 1, wherein the predetermined voltage falls in the range between the operating voltage of an external power during a normal operation and the power-off voltage.

3. The LCD power-off residual image improving system of claim 1, wherein the predetermined pattern is a white signal being applied to the whole LCD frame.

4. The LCD power-off residual image improving system of claim 1, wherein the predetermined pattern is a black signal being applied to the whole LCD frame.

5. The LCD power-off residual image improving system of claim 1, wherein the video and timing control unit further comprises:

an internal pattern generator for providing the predetermined pattern;

a multiplexer for switching the input pattern signal source to the internal pattern generator to receive the predetermined pattern according to the control signal of the voltage detector; and an internal oscillator for providing a local clock to control the predetermined pattern from the output of the multiplexer.

6. A LCD power-off residual image improving system, comprising:

a power supply for providing an operating power;

a voltage detector for detecting the voltage level of an external power by comparison to a predetermined voltage level under the operating power and producing a control signal by comparing the result;

a video and timing control unit for outputting a predetermined pattern to the LCD according to the control signal so as to improve the residual image effect; and a display matrix circuit for receiving the predetermined pattern to update the LCD frame and improve the residual image effect on the display.

7. The LCD power-off residual image improving system of claim 6, wherein the predetermined voltage falls in the range between the operating voltage of an external power during a normal operation and the power-off voltage.

8. The LCD power-off residual image improving system of claim 6, wherein the predetermined pattern is a white signal being applied to the whole LCD frame.

9. The LCD power-off residual image improving system of claim 6, wherein the predetermined pattern is a black signal being applied to the whole LCD frame.

10. The LCD power-off residual image improving system of claim 6, wherein the video and timing control unit further comprises:

an internal pattern generator for providing the predetermined pattern;

a multiplexer for switching the input pattern signal source to the internal pattern generator to receive the predetermined pattern according to the control signal of the voltage detector; and an internal oscillator for providing a local clock to control the output of the predetermined pattern from the multiplexer to the display matrix circuit.

11. The LCD power-off residual image improving system of claim 6, wherein the display matrix circuit further comprises:

a gate driver for selecting a row and column;

a data driver for inputting the predetermined pattern according the selected row and column; and a LCD for displaying the inputted predetermined pattern.

12. A LCD power-off residual image improving method, comprising the steps:

setting a predetermined voltage value according to an operating voltage;

detecting an external power level according to the predetermined voltage value to output a control signal to a video and timing control unit;

outputting a predetermined pattern from the video and timing control unit according to the control signal; and displaying the predetermined pattern on a LCD.

13. The LCD power-off residual image improving method of claim 12, wherein the predetermined voltage falls in the range between the operating voltage of an external power during a normal operation and the power-off voltage.

14. The LCD power-off residual image improving system of claim 12, wherein the predetermined pattern is a white signal being applied to the whole LCD frame.

15. The LCD power-off residual image improving system of claim 12, wherein the predetermined pattern is a black signal being applied to the whole LCD frame.

* * * * *